United States Patent
Beaulieu et al.

(10) Patent No.: US 8,130,817 B2
(45) Date of Patent: Mar. 6, 2012

(54) NON-DATA-AIDED CHANNEL ESTIMATORS FOR MULTIPATH AND MULTIPLE ANTENNA WIRELESS SYSTEMS

(75) Inventors: Norman C. Beaulieu, Edmonton (CA); Yunfei Chen, Nanjing (CN)

(73) Assignee: The Governors of the University of Alberta (CA)

( * ) Notice: Subject to any disclaimer, the term of this patent is extended or adjusted under 35 U.S.C. 154(b) by 699 days.

(21) Appl. No.: 12/282,119

(22) PCT Filed: Mar. 7, 2007

(86) PCT No.: PCT/CA2007/000356
§ 371 (c)(1),
(2), (4) Date: Dec. 9, 2008

(87) PCT Pub. No.: WO2007/101338
PCT Pub. Date: Sep. 13, 2007

(65) Prior Publication Data
US 2009/0092058 A1  Apr. 9, 2009

Related U.S. Application Data

(60) Provisional application No. 60/779,415, filed on Mar. 7, 2006.

(51) Int. Cl.
*H04B 1/00* (2006.01)
*H04L 27/06* (2006.01)

(52) U.S. Cl. ........................................ 375/147; 375/340

(58) Field of Classification Search .................. 375/147, 375/267, 340
See application file for complete search history.

(56) References Cited

U.S. PATENT DOCUMENTS

| | | | |
|---|---|---|---|
| 5,630,208 A | 5/1997 | Enge et al. | |
| 5,659,576 A | 8/1997 | Critchlow et al. | |
| 6,128,276 A | 10/2000 | Agee | |
| 6,768,780 B1 * | 7/2004 | Lakkis et al. | 375/355 |
| 6,807,227 B2 | 10/2004 | Chien | |
| 7,061,970 B2 * | 6/2006 | Reed et al. | 375/148 |
| 7,505,523 B1 * | 3/2009 | Lee et al. | 375/260 |
| 7,555,078 B2 * | 6/2009 | Lozhkin | 375/347 |

FOREIGN PATENT DOCUMENTS

CA    2525232    12/2004

OTHER PUBLICATIONS

Y. Chen, and N. C. Beaulieu, "CRLBs NDA ML estimation of UWB channels", IEEE Communications Letters, vol. 9, pp. 709-711, Aug. 2005.

(Continued)

*Primary Examiner* — Don N Vo
(74) *Attorney, Agent, or Firm* — McDonnell Boehnen Hulbert & Berghoff LLP

(57) ABSTRACT

Novel non-data-aided maximum likelihood estimators for the delays and the attenuations in an ultra-wide bandwidth channel are proposed. Numerical results show that these new estimators outperform the previous non-data-aided maximum likelihood channel estimators derived in the literature. Moreover, in some cases, the performances of the new non-data-aided estimators approach those of the data-aided estimators, enabling us to reduce the overhead expense of pilot symbols.

50 Claims, 7 Drawing Sheets

OTHER PUBLICATIONS

M.Z. Win and R.A. Scholtz, "Ultra-wide bandwidth time-hopping spread sprectrum impulse radio for wireless multiple-access communications," IEEE Trans. Commun., vol. 48, pp. 679-691, Apr. 2000.

M.Z. Win and R.A. Scholtz, "Impulse radio: how it works," IEEE Commun. Lett., vol. 2, pp. 36-38, Feb. 1998.

S. Roy, J.R. Foerster, V.S. Somayazulu, and D.G. Leeper, "Ultrawideband radio design: the promise of high-speed, short-range wireless connectivity," Proc. IEEE, vol. 92, pp. 295-311, Feb. 2004.

J.D. Choi and W.E. Stark, "Performance of ultra-wideband communications with suboptimal receivers in multipath channels," IEEE J. Select Areas Commun., vol. 20, pp. 1754-1766, Dec. 2002.

G.L. Turin, "Introduction to spread-sprectrum antimultipath techniques and their application to urban digital radio," Proc. IEEE, vol. 68, pp. 328-353, Mar. 1980.

M.Z. Win and R.A. Scholtz, "On the energy capture of ultrawide bandwidth signals in dense multipath environments," IEEE Commun. Lett., vol. 2, pp. 245-247, Sep. 1998.

V. Lottici, A. D'Andrea, and U. Mengali, "Channel estimation for ultrawideband communications," IEEE J. Select. Areas Commun., vol. 20, pp. 1638-1645, Dec. 2002.

J. Foerster and Q. Li, "UWB channel modeling contribution from Intel," Intel Corp., IEEE P802.15-02/279r0-SG3a, Jun. 2002.

Y. Chen, "Wireless channel state and model parameter estimation," Ph.D. Thesis, University of Alberta, Jan. 2006.

* cited by examiner

NON-DATA-AIDED CHANNEL ESTIMATORS FOR MULTIPATH AND MULTIPLE ANTENNA WIRELESS SYSTEMS

RELATED APPLICATION

This application is a National Phase Entry of International PCT Application No. PCT/CA2007/000356 filed on Mar. 7, 2007. This application claims the benefit of prior U.S. provisional application No. 60/779,415 filed Mar. 7, 2006, hereby incorporated by reference in its entirety.

FIELD OF THE INVENTION

The invention relates to delay and attenuation estimation in ultra-wide bandwidth (UWB) channels.

BACKGROUND OF THE INVENTION

In order to receive a signal over one or more communication channels, it is often beneficial to determine an estimate of one or more properties of the communication channels. For example, in some cases, an estimation of the delay and attenuation of a communication channel may aid in reception of a signal over that channel. Recently, ultra-wide bandwidth technology has been proposed as a possible candidate for high-speed, short-range wireless communications, as described in a first reference by M. Z. Win and R. A. Scholtz, "Ultra-wide bandwidth time-hopping spread spectrum impulse radio for wireless multiple-access communications," IEEE Trans. Commun., Vol. 48, pp. 679-691, April 2000 (hereinafter referred to as the first reference); a second reference by M. Z. Win and R. A. Scholtz, "Impulse radio: how it works," IEEE Commun. Lett., vol. 2, pp. 36-38, February 1998 (hereinafter referred to as the second reference); and a third reference by S. Roy, J. R. Foerster, V. S. Somayazulu, and D. G. Leeper, "Ultrawideband radio design: the promise of high-speed, short-range wireless connectivity," Proc. IEEE, vol. 92, pp. 295-311, February 2004 (hereinafter referred to as the third reference), which are hereby incorporated by reference in their entirety.

Much research has been conducted to derive receivers that fully explore the benefits of an UWB system, as described, for example, in J. D. Choi and W. E. Stark, "Performance of ultra-wideband communications with suboptimal receivers in multipath channels," IEEE J. Select. Areas Commun., vol. 20, pp. 1754-1766, December 2002 (hereinafter referred to as the fourth reference), which is hereby incorporated by reference in its entirety. Among all the UWB receivers studied, the Rake receiver is considered to be a practically achievable structure with good performance, as described, for example, in G. L. Turin, "Introduction to spread-spectrum antimultipath techniques and their application to urban digital radio," Proc. IEEE, vol. 68, pp. 328-353, March 1980 (hereinafter referred to as the fifth reference), which is hereby incorporated by reference in its entirety. In the Rake receiver, the received signal is often assumed to be a superposition of many delayed and attenuated copies of the transmitted signal. The rake receiver may use knowledge of the delays and the attenuations introduced by the UWB channel in order to perform coherent detection. As a result, estimating the channel delays and the channel attenuations before data recovery may be useful. As described in M. Z. Win and R. A. Scholtz, "Ort the energy capture of ultrawide bandwidth signals in dense multipath environments," IEEE Commun. Lett., vol. 2, pp. 245-247, September 1998 (hereinafter referred to as the sixth reference), maximum likelihood (ML) estimators nor the UWB channel delays and the UWB channel attenuations have been proposed using unmodulated UWB signals. The estimators in the sixth reference require unmodulated signals and this is generally impractical for Rake receivers. As described in V. Lottici, A. D'Andrea, and U. Mengali, "Channel estimation for ultrawideband communications," IEEE J. Select. Areas Commun., vol. 20, pp. 1638-1645, December 2002 (hereinafter referred to as the seventh reference), which is hereby incorporated by reference in its entirety, data-aided (DA) and non-data-aided (NDA) ML estimators for the delays and the attenuations in a UWB channel are obtained using time-hopped and pulse-position-modulated (TH-PPM) UWB signals. The data aided estimators in the seventh reference uses practical signals but also uses the transmission of overhead symbols. The non-data aided estimator in the seventh reference does not use overhead symbols but has poor performance.

SUMMARY OF THE INVENTION

According to one broad aspect, the invention provides a method comprising: estimating at least delays $\tau_1$ using a maximum likelihood estimator with modified ln cosh approximation;

as part of the maximum likelihood estimator with modified ln cosh approximation, approximating $$\ln\cosh\left(\sum_{i=1}^{N} a_i b_i\right) = \sum_{i=1}^{N} a_i |b_i|$$

where $a_i, b_i$ are variables used in the maximum likelihood estimator with modified ln cosh approximation.

In some embodiments, the method further comprises estimating attenuations $\gamma_1$ using the maximum likelihood estimator with modified ln cosh approximation.

In some embodiments, the method further comprises: receiving a signal over a multipath channel, wherein $\tau_1$ and $\gamma_1$ correspond to delays and attenuations of multipath components of the multipath channel respectively.

In some embodiments, the method further comprises: receiving a respective signal over each of a plurality of antennas, wherein $\tau_1$ and $\gamma_1$ correspond to delays and attenuations of the signals.

In some embodiments, the signal comprises an ultra-wide bandwidth signal.

In some embodiments, the signal comprises a signal with a signal bandwidth of at least 20% of a center frequency of the signal.

In some embodiments, the signal comprises a signal with a signal bandwidth of at least 15% of a center frequency of the signal.

In some embodiments, the signal comprises a plurality of pulses with a pulse width of less than about 1 ns.

In some embodiments, the signal comprises a broadband signal.

In some embodiments, the signal comprises a CDMA (code division multiple access) signal.

In some embodiments, the method further comprises: receiving a respective signal over each of a plurality of antennas in a multiple receiver antenna diversity system, wherein $\tau_1$ and $\gamma_1$ collectively comprise a respective delay and a respective attenuation for each signal.

In some embodiments, the method further comprises performing maximal ratio combining.

In some embodiments, the method further comprises performing equal gain combining.

In some embodiments, using the maximum likelihood estimator with modified ln cosh approximation comprises maximizing an approximation of $$\ln\Lambda(\theta) = C - \frac{ME_p}{N_0}\sum_{l=1}^{L_c}\gamma_l^2 + \sum_{m=0}^{M-1}[\text{lncosh}(\alpha_m) + \beta_m]$$

where $\theta=[\gamma_1, \ldots, \gamma_{L_c}, \tau_1, \ldots, \tau_{L_c}]$ is a parameter vector, C is a constant independent of $\theta$ $$E_p = \int_0^{NT_f} p^2(t)dt$$

is the signal energy, cosh(•) is the hyperbolic cosine function, $$\alpha_m = \sum_{l=1}^{L_c}\gamma_l\alpha_{ml},$$

$$\alpha_{ml} = \frac{1}{N_0}\int_{t_m}^{t_m+NT_f} r(t)[p(t-t_m-\tau_l) - p(t-t_m-\tau_l-\delta)]dt,$$

$$\beta_m = \sum_{l=1}^{L_c}\gamma_l\beta_{ml}, \beta_{ml} = \frac{1}{N_0}\int_{t_m}^{t_m+NT_f} r(t)\left[\begin{array}{c}p(t-t_m-\tau_l) + \\ p(t-t_m-\tau_l-\delta)\end{array}\right]dt,$$

and $t_m = mNT_f$, and where $\text{lncosh}\left(\sum_{i=1}^{N}a_ib_i\right) = \sum_{i=1}^{N}a_i|b_i|$ is used to approximate $$\text{lncosh}(\alpha_m) \approx \sum_{l=1}^{L_c}\gamma_l|\alpha_{ml}|,$$

with $a_i = \gamma_l$, and $b_i = \alpha_{ml}$.

In some embodiments, $$\alpha_{ml} = \frac{1}{N_0}\int_{t_m}^{t_m+NT_f} r(t)[p(t-t_m-\tau_l) - p(t-t_m-\tau_l-\delta)]dt,$$

$$\beta_{ml} = \frac{1}{N_0}\int_{t_m}^{t_m+NT_f} r(t)[p(t-t_m-\tau_l) + p(t-t_m-\tau_l-\delta)]dt$$

are calculated using sampled versions of r(t) and p(t).

In some embodiments, the method comprises using the approximation for ln cosh to obtain an expression for $$J^2(\tau) = \left(\sum_{m=0}^{M-1}\frac{|\alpha_{ml}| + \beta_{ml}}{2}\right)^2$$

wherein the NDA ML estimates with modified ln cosh approximation of $\tau_l$, l=1, 2, . . . , $L_c$, are obtained by locating $L_c$ maximas of $J^2(\tau)$, and denoting $\hat{\tau}_l$ as the estimate of $\tau_l$, obtaining the NDA ML estimates with modified ln cosh approximation of $\gamma_l$, $\hat{\gamma}_l$, using $$\hat{\gamma}_l = \frac{N_0}{ME_p}|J(\hat{\tau}_l)|.$$

In some embodiments, the signal comprises a pulse position modulated signal.

In some embodiments, using the maximum likelihood estimator with modified ln cosh approximation comprises maximizing an approximation of $$\ln\Lambda(\theta) = C - \frac{ME_p}{N_0}\sum_{l=1}^{L_c}\gamma_l^2 + \sum_{m=0}^{M-1}[\text{lncosh}(\alpha_m) + \beta_m]$$

where $\theta=[\gamma_1, \ldots, \gamma_{L_c}, \tau_1, \ldots, \tau_{L_c}]$ is a parameter vector, C is a constant independent of $\theta$ $$E_p = \int_0^{NT_f} p^2(t)dt$$

is the signal energy, cosh(•) is the hyperbolic cosine function, $$\alpha_m = \sum_{l=1}^{L_c}\gamma_l\alpha_{ml},$$

$$\alpha_{ml} = \frac{2}{N_0}\int_{t_m}^{t_m+NT_f} r(t)p(t-t_m-\tau_l)dt,$$

$$\beta_m = \sum_{l=1}^{L_c}\gamma_l\beta_{ml},$$

$$\beta_{ml} = 0,$$

and $t_m = mNT_f$, and where $$\text{lncosh}\left(\sum_{i=1}^{N}a_ib_i\right) = \sum_{i=1}^{N}a_i|b_i|$$

is used to approximate $$\text{lncosh}(\alpha_m) \approx \sum_{l=1}^{L_c}\gamma_l|\alpha_{ml}|,$$

with $a_i = \gamma_l$, and $b_i = \alpha_{ml}$.

In some embodiments, the signal comprises a BPSK (Binary Phase Shift Keying) modulated signal.

According to another broad aspect, the invention provides a method of estimating delays and attenuations comprising: receiving an incoming signal over a time duration of multiple bit intervals; generating a local template; correlating the incoming signal with the sum of the original local template and a shifted local template over each bit interval to generate a first correlation function over each bit interval; adding the above generated first correlation functions over multiple bit intervals and dividing the result by 2 as metric 1; correlating the incoming signal with the difference of the original local template and the shifted local template over each bit interval to generate a second correlation function over each bit interval; adding the absolute values of the above generated second correlation functions over multiple bit intervals and dividing the result by 2 as metric 2; determining a number of maximas of the square of the sum of metric 1 and metric 2; calculating locations of the maximas as the delays; calculating scaled values of the maximas as the attenuations.

In some embodiments, receiving an incoming signal comprises receiving a pulse position modulated ultra-wide bandwidth signal over a multipath channel and the delays and the attenuations correspond to delays and attenuations of multipath components.

In some embodiments, the local template is generated by any one of the following: changing positions of ultra-wide bandwidth pulses according to a user's time-hopping code in a time-hopping ultra-wide bandwidth system; and spreading ultra-wide bandwidth pulses according to a user's spreading code in a direct-sequence ultra-wide bandwidth system over each bit interval.

In some embodiments, the shifted local template is generated by shifting the original local template with a time equal to the time shift in pulse position modulation over each bit interval.

In some embodiments, a discrete (sampled signal) correlator is used to calculate a correlation value of the sampled incoming ultra-wide bandwidth signal and the sampled local templates.

In some embodiments, the steps of correlating the incoming ultra wide bandwidth signal with the sure and the difference of the original local template and the shifted local template over each bit interval comprise:

a) shifting the sum and the difference of the original local template and the shifted local template over each bit interval with multiples of the ultra-wide bandwidth pulse duration;

b) sampling the incoming ultra-wide bandwidth signal and the shifted sum and difference of the local templates over each bit interval; and c) calculating a correlation value of the sampled incoming ultra-wide bandwidth signal and the sampled shifted sum and difference of the local templates over each bit interval.

In some embodiments, the step of determining a number of maximas of the square of the sum of metric 1 and metric 2 comprises:

a) comparing all the correlation values calculated; and b) selecting $L_c$ largest values with $L_c$ at most equal to the number of multi-path components of the multipath channel.

According to yet another broad aspect, the invention provides a method of estimating delays and attenuations of an ultra-wide bandwidth channel comprising: receiving an incoming signal over a time duration of multiple bit intervals; generating a local template; correlating the incoming signal with the local template over each bit interval to generate a correlation function over each bit interval; adding the absolute values of the above generated correlation functions over multiple bit intervals as metric 1; determining a number of maximas of the square of metric 1; calculating the locations of the maximas as the delays; calculating scaled values of the maximas as the attenuations.

In some embodiments, the signal comprises a BPSK (binary phase shift keying) modulated ultra-wide, bandwidth signal received over a multipath channel and the delays and the attenuations correspond to delays and attenuations of multipath components of the multipath channel.

In some embodiments, the local template is generated by any one of the following: changing positions of ultra-wide bandwidth pulses according to a user's time-hopping code in a time-hopping ultra-wide bandwidth system; and spreading ultra-wide bandwidth pulses according to a user's spreading code in a direct-sequence ultra-wide bandwidth system over each bit interval.

In some embodiments, a discrete (sampled signal) correlator is used to calculate a correlation value of the sampled incoming ultra-wide bandwidth signal and the sampled local templates.

In some embodiments, the steps of correlating the incoming ultra-wide bandwidth signal with the original local template over each bit interval comprise:

a) sampling the incoming ultra-wide bandwidth signal and the original local template over each bit interval; and b) calculating a correlation value of the sampled incoming ultra-wide bandwidth signal and the sampled original local template over each bit interval.

In some embodiments, the step of determining a number of maximas of the square of metric 1 comprises:

a) comparing all the correlation values calculated; and b) selecting $L_c$ largest values with $L_c$ at most equal to the number of multi-path components of the multipath channel.

In some embodiments, the scaled values of the maxima are obtained by dividing the values of the maxima with the signal-to-noise-ratio and the number of bits used in the estimation.

According to still another broad aspect, the invention provides an apparatus operable to estimate at least delays $\tau_1$, comprising: a MLE (Maximum Likelihood Estimator) with modified ln cosh approximation according to $$\text{lncosh}\left(\sum_{i=1}^{N} a_i b_i\right) = \sum_{i=1}^{N} a_i |b_i|$$

where $a_i, b_i$ are variables used in the MLE with modified ln cosh approximation.

In some embodiments, the apparatus is operable to estimate attenuations $\gamma_1$.

In some embodiments, the apparatus further comprises; at least one antenna operable to receive a signal over a multipath channel, wherein $\tau_1$ and $\gamma_1$ correspond to delays and attenuations of multipath components of the multipath channel respectively.

In some embodiments, the apparatus further comprises: a plurality of antennas respectively operable to receive a respective signal, wherein $\tau_1$ and $\gamma_1$ correspond to delays and attenuations of the signals.

In some embodiments, the signal comprises an ultra-wide bandwidth signal.

In some embodiments, the signal comprises a signal with a signal bandwidth of at least 20% of a center frequency of the signal.

In some embodiments, the signal comprises a signal with a signal bandwidth of at least 15% of a center frequency of the signal.

In some embodiments, the signal comprises a plurality of pulses with a pulse width of less than about 1 ns.

In some embodiments, the signal comprises a broadband signal.

In some embodiments, the signal comprises a CDMA (code division multiple access) signal.

In some embodiments, the apparatus further comprises: a plurality of antennas in a multiple receiver antenna diversity system respectively operable to receive a respective signal, wherein $\tau_l$ and $\gamma_l$ collectively comprise a respective delay and a respective attenuation for each signal.

In some embodiments, the apparatus is operable to perform maximal ratio combining.

In some embodiments, the apparatus is operable to perform equal gain combining.

In some embodiments, the apparatus is operable to receive pulse position modulated signals, wherein the MLE with modified ln cosh approximation maximizes an approximation of $$\ln \Lambda(\theta) = C - \frac{ME_p}{N_0} \sum_{l=1}^{L_c} \gamma_l^2 + \sum_{m=0}^{M-1} [\text{lncosh}(\alpha_m) + \beta_m]$$

where $\theta = [\gamma_1, \ldots, \gamma_{L_c}, \tau_1, \ldots, \tau_{L_c}]$ is a parameter vector, C is a constant independent of $\theta$, $$E_p = \int_0^{NT_f} p^2(t)\, dt$$

is the signal energy, $\cosh(\cdot)$ is the hyperbolic cosine function, $$\alpha_m = \sum_{l=1}^{L_c} \gamma_l \alpha_{ml},$$

$$\alpha_{ml} = \frac{1}{N_0} \int_{t_m}^{t_m + NT_f} r(t)[p(t - t_m - \tau_l) - p(t - t_m - \tau_l - \delta)]\, dt,$$

$$\beta_m = \sum_{l=1}^{L_c} \gamma_l \beta_{ml},$$

$$\beta_{ml} = \frac{1}{N_0} \int_{t_m}^{t_m + NT_f} r(t)[p(t - t_m - \tau_l) + p(t - t_m - \tau_l - \delta)]\, dt,$$

and $t_m = mNT_f$, and where $$\text{lncosh}\left(\sum_{i=1}^{N} a_i b_i\right) = \sum_{i=1}^{N} a_i |b_i|$$

is used to approximate $$\text{lncosh}(\alpha_m) \approx \sum_{l=1}^{L_c} \gamma_l |\alpha_{ml}|,$$

with $a_i = \gamma_l$, and $b_i = \alpha_{ml}$.

In some embodiments, $$\alpha_{ml} = \frac{1}{N_0} \int_{t_m}^{t_n + NT_f} r(t)[p(t - t_m - \tau_l) - p(t - t_m - \tau_l - \delta)]\, dt$$

$$\beta_{ml} = \frac{1}{N_0} \int_{t_m}^{t_m + NT_f} r(t)[p(t - t_m - \tau_l) + p(t - t_m - \tau_l - \delta)]\, dt$$

are calculated by the MLE with modified ln cosh approximation using sampled versions of r(t) and p(t).

In some embodiments, the MLE with modified. ln cosh approximation uses the approximation for ln cosh to obtain an expression for $$J^2(\tau) = \left(\sum_{m=0}^{M-1} \frac{|\alpha_{mt}| + \beta_{mt}}{2}\right)^2$$

wherein the NDA ML estimates of $\tau_l$, $l=1, 2, \ldots, L_c$, are obtained by locating $L_c$ maximas of $J^2(\tau)$, and denoting $\hat{\tau}_l$ as the estimate of $\tau_l$, obtaining the NDA ML estimate of $\gamma_l$, $\hat{\gamma}_l$, using $$\hat{\gamma}_l = \frac{N_0}{ME_p} |J(\hat{\tau}_l)|.$$

In some embodiments, the apparatus is operable to receive BPSK (binary phase shift keying) modulated signals, wherein the MLE maximizes an approximation of $$\ln \Lambda(\theta) = C - \frac{ME_p}{N_0} \sum_{l=1}^{L_c} \gamma_l^2 + \sum_{m=0}^{M-1} [\text{lncosh}(\alpha_m) + \beta_m]$$

where $\theta = [\gamma_1, \ldots, \gamma_{L_c}, \tau_1, \ldots, \tau_{L_c}]$ is a parameter vector, C is a constant independent of $\theta$, $$E_p = \int_0^{NT_f} p^2(t)\, dt$$

is the signal energy, $\cosh(\cdot)$ is the hyperbolic cosine function, $$\alpha_m = \sum_{l=1}^{L_c} \gamma_l \alpha_{ml},$$

$$\alpha_{ml} = \frac{2}{N_0} \int_{t_m}^{t_m + NT_f} r(t) p(t - t_m - \tau_l)\, dt,$$

$$\beta_m = \sum_{l=1}^{L_c} \gamma_l \beta_{ml},$$

$$\beta_{ml} = 0,$$

and $t_m = mNT_f$, and where $$\ln \cosh\left(\sum_{i=1}^{N} a_i b_i\right) = \sum_{i=1}^{N} a_i |b_i|$$

is used to approximate $$\ln\cosh(\alpha_m) \approx \sum_{l=1}^{L_c} \gamma_l |\alpha_{ml}|, \quad\quad (5)$$

with $a_i = \gamma_l$, and $b_i = \alpha_{ml}$.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described with reference to the attached drawings in which.

DETAILED DESCRIPTION

Figure 1:
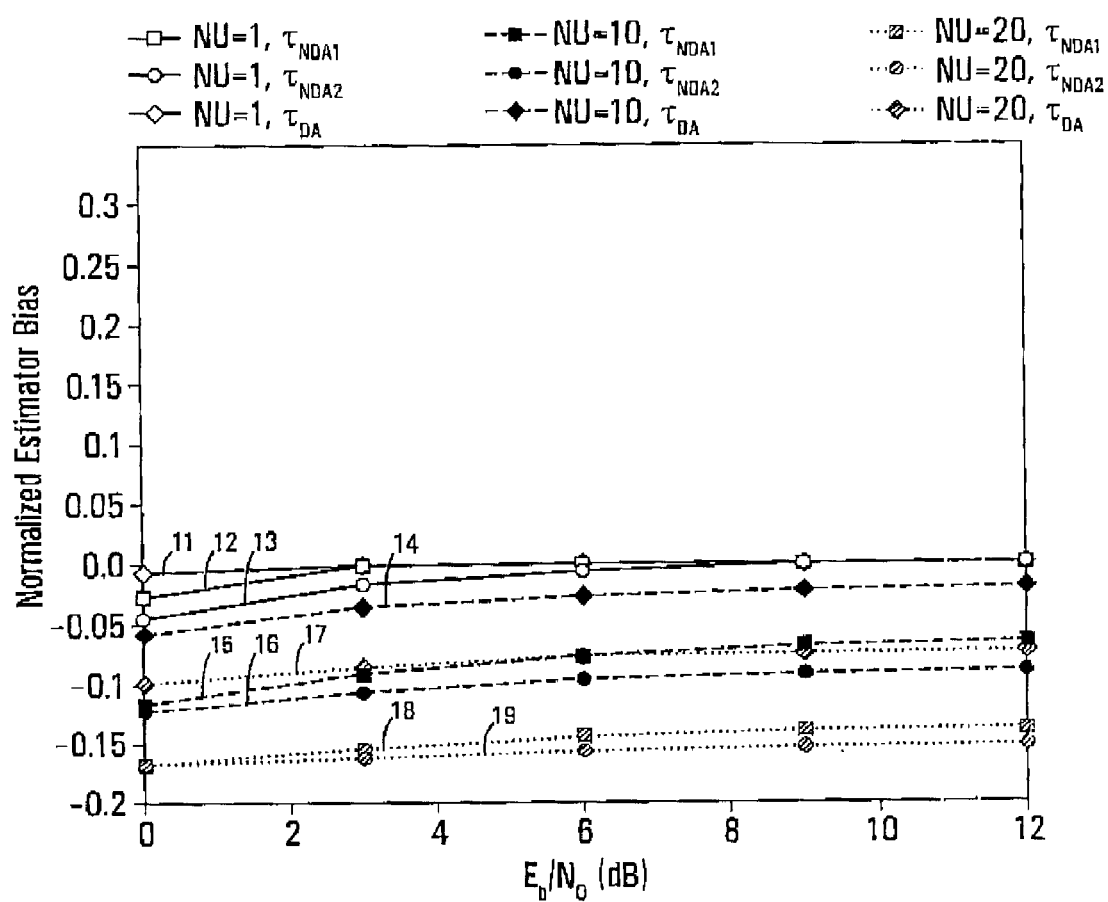
FIG. 1 contains plots of the normalized biases of $\tau_{NDA1}$, $\tau_{NDA2}$ and $\tau_{DA}$ for different numbers of users.

An embodiment will be described as applied to a UWB system where the signal is time-hopped and pulse position modulated. The transmitted signal of the desired user can be expressed as $$s(t) = \sum_m p(t - mNT_f - b_m\delta) \quad\quad (1)$$

where m indexes the transmitted information bit, $NT_f$ is the bit interval with N being the repetition length and $T_f$ being the frame interval, $b_m \in \{0,1\}$ is the transmitted bit with equal a prior probabilities, $\delta$ is the additional time shift introduced when the transmitted bit is the bit signal with is 1, $$p(t) = \sum_{n=0}^{N-1} g(t - nT_f - c_R T_c)$$

is the bit signal with $\{c_n, 0 \leq c_n \leq N_h - 1\}$ being the time hopping code of the desired user, $T_c$ being the chip time, and g(t) being the monocycle pulse used in the system. It has been shown in J. Foerster and Q. Li, "UWB channel modeling contribution from Intel," Intel Corp., IEEE P802.15-02/279r0-SG3a, June 2002, which is hereby incorporated by reference in its entirety, that the UWB channel can be modeled as a multipath fading channel where the received signal is a superposition of many delayed and attenuated versions of the transmitted signal. Thus, one has the received signal of the desired user as $$r(t) = \sum_{l=1}^{L_c} \gamma_l s(t - \tau_l) + w(t) \quad\quad (2)$$

where l indexes different multipath components, $L_c$ is the number of multipath components available, $\gamma_l$ is the attenuation of the l-th component, $\tau_l$ is the delay of the l-th component, and w(t) is the interference-plus-noise term. The number of multipath components, $L_c$, is assumed known. The interference-plus-noise term is assumed to be white and Gaussian with power spectral density $N_0/2$, as in the seventh reference. The parameters, $\gamma_l$ and $\tau_l$, $l=1, 2, \ldots, L_c$, are needed in the Rake receiver, as described in the fifth reference. Embodiments of the invention provide estimators for these parameters.

In general, equation (2) is applicable to both multipath systems and multiple receiver antenna systems. In the multiple receiver antenna systems, $L_c$ corresponds to the number of receiver antennas and $\tau_l$ is the branch delay of the l-th antenna branch signal component.

NDA ML Channel Estimators

Assume that the received signal in (2) is observed over a time duration of $(0, T_0]$ with $T_0 = M \times (NT_f)$, and that $\int_0^{T_0} s(t-\tau_{l_1})s(t-\tau_{l_2})dt \approx 0$ ($l_1 \neq l_2$) and $\tau_l < T_f - (N_h - 1)T_c - \delta$ ($l=1, 2, \ldots, L_c$) so that no inter-path interference, inter-symbol interference, or inter-frame interference occur, as described in the seventh reference. Also, assume that: the M information bits transmitted over $(0, T_0]$ are independently and identically distributed. The log-likelihood function can be derived, as described in Y. Chen and N. C. Beaulieu, "CRLBs for NDA ML estimation of UWB channels," IEEE Commun. Lett., vol. 9, pp. 709-711, August 2005, which is hereby incorporated by reference in its entirety, according to $$\ln \Lambda(\theta) = C - \frac{ME_p}{N_0}\sum_{l=1}^{L_c}\gamma_l^2 + \sum_{m=0}^{M-1}[\ln\cosh(\alpha_m) + \beta_m] \quad\quad (3)$$

where $\theta = [\gamma_1, \ldots, \gamma_{L_c}, \tau_1, \ldots, \tau_{L_c}]$ is the parameter vector, C is a constant independent of $\theta$, $E_p = \int_0^{NT_f} p^2(t)dt$ is the signal energy, $\cosh(\cdot)$ is the hyperbolic cosine function, $$\alpha_m = \sum_{l=1}^{L_c} \gamma_l \alpha_{ml},$$

$$\alpha_{ml} = \frac{1}{N_0}\int_{t_m}^{t_m+NT_f} r(t)[p(t - t_m - \tau_l) - p(t - t_m - \tau_l - \delta)]dt,$$

$$\beta_m = \sum_{l=1}^{L_c} \gamma_l \beta_{ml},$$

$$\beta_{ml} = \frac{1}{N_0}\int_{t_m}^{t_m+NT_f} r(t)[p(t - t_m - \tau_l) + p(t - t_m - \tau_l - \delta)]dt,$$

and $t_m = mNT_f$. Using (3), NDA ML estimators for the channel delays and the channel attenuations in an UWB system can then be derived. However, the nonlinearity of the hyperbolic cosine function in (3) makes this derivation untractable. In equation (25) of the seventh reference, the authors approximated (3) with $$\ln \Lambda(\theta) \approx -\frac{ME_p}{N_0} \sum_{l=1}^{L_c} \gamma_l^2 + \sum_{m=0}^{M-1} \beta_m \qquad (4)$$

to overcome this difficulty. The approximate log-likelihood function in (4) was obtained by using the approximation in equation (24) of the seventh reference. Equivalently, ore can also obtain (4) from (3) by using the approximation of $$\ln \cosh(\alpha_m) \approx 0. \qquad (5)$$

Based on (4), NDA ML estimators for the channel delays and the channel attenuations were derived in the seventh reference. Note that the performances of the NDA ML estimators depend on the accuracy of the approximation to (3). Note further that (5) has large approximation errors, especially when the signal-to-interference-plus-noise ratio (SINR) is large. One can improve the performances of the NDA ML estimators in the seventh reference by using an approximation that is more accurate than (5). According to an embodiment of the invention, the approximation $$\ln \cosh(\alpha_m) \approx \sum_{l=1}^{L_c} \gamma_l |\alpha_{ml}| \qquad (6)$$

is employed. This is obtained by using the approximation ln cosh($\alpha_m$)≈|$\alpha_m$| together with the approximation $$|\alpha_m| \approx \sum_{l=1}^{L_c} \gamma_l |\alpha_{ml}|.$$

By using (6), the log-likelihood function in (3) can be approximated as $$\ln \Lambda(\theta) \approx -\frac{ME_p}{N_0} \sum_{l=1}^{L_c} \gamma_l^2 + \sum_{m=0}^{M-1} \left[ \sum_{l=1}^{L_c} \gamma_l |\alpha_{ml}| + \beta_m \right] \qquad (7)$$

Comparing (7) with (4), one sees that there is an additional term $$\sum_{m=0}^{M-1} \sum_{l=1}^{L_r} \gamma_l |\alpha_{ml}|$$

in (7). One has from (7)

$$\ln \Lambda(\theta) \approx -\frac{ME_p}{N_0} \sum_{l=1}^{L_c} \left[ \gamma_l - \frac{N_0}{ME_p} J(\tau_l) \right]^2 + \frac{N_0}{ME_p} J \qquad (8)$$

where $$J(\tau_l) = \sum_{m=0}^{M-1} \frac{|\alpha_{ml}| + \beta_{ml}}{2} \text{ and } J = \sum_{l=1}^{L_c} J^2(\tau_l).$$

Since the maximum of J is found by maximizing each of $J^2(\tau_l)$, $l=1, 2, \ldots, L_c$, the NDA ML estimates of $\tau_l$, $l=1, 2, \ldots, L_c$, are obtained by locating $L_c$ maximas of $J^2(\tau)$.

Expressions for $J^2(\tau)$ result by replacing $\tau_l$ with $\tau$ in the above expressions for $\alpha_{ml}$ and $\beta_{ml}$ to yield expressions for $\alpha_{m\tau}$, $\beta_{m\tau}$, and using these in the above expression for $J^2(\tau_l)$ to give $$J^2(\tau) = \left( \sum_{m=0}^{M-1} \frac{|\alpha_{m\tau}| + \beta_{m\tau}}{2} \right)^2.$$

Denoting $\hat{\tau}_l$ as the estimate of $\tau_l$, the NDA ML estimate of $\gamma_l$, $\hat{\gamma}_l$, is $$\hat{\gamma}_l = \frac{N_0}{ME_p} |J(\hat{\tau}_l)| \qquad (9)$$

as the attenuation is always positive. The performances of these estimators will be examined in the next section.

Numerical Results and Discussion

In this section, the performances of the new NDA ML estimators are examined and compared with those of the NDA ML estimators and the DA ML estimators derived in the seventh reference, with a focus on the estimation of $\tau_1$ and $\gamma_1$. For convenience, the new NDA ML estimators for $\tau_1$ and $\gamma_1$ are denoted as $\tau_{NDA1}$ and $\gamma_{NDA1}$, respectively, and the previous NDA ML estimators for $\tau_1$ and $\gamma_1$ in the seventh reference are denoted as $\tau_{NDA1}$ and $\gamma_{NDA2}$, respectively, and the previous DA ML estimators for $\tau_1$ and $\gamma_1$ in the seventh reference are denoted as $\tau_{DA}$ and $\gamma_{DA}$, respectively. A monocycle pulse of shape $$g(t) = \left[ 1 - 16\pi \left( \frac{t - 0.5D_g}{D_g} \right)^2 \right] \exp\left[ -8\pi \left( \frac{t - 0.5D_g}{D_g} \right)^2 \right] \qquad (10)$$

is used, where $D_g$ is the pulse duration, as described in the seventh reference. Note that the estimator is also applicable to other pulse shapes. The received signal is sampled with a sampling internal of $T_s=0.1D_g$. Choose N=5, $N_h$=5, δ=1.2$D_g$, $T_f$=20$D_g$, and $$T_c = \frac{T_f}{N_h}.$$

Denote NU as the number of users in the UWB system. The cases when NU=1, NU=10 and NU=20 are considered. A sample size of M=10 is used. Similar to the seventh reference, the number of multipath components is assumed to be $L_c$=3, the multipath delays are the same for all users and are set at $\tau_l$=5l$D_g$, l=1, 2, 3, the multipath attenuations vary from user to user and are assumed to be independent Rayleigh random variables with an exponential power-delay profile of $E\{\gamma_l^2\}=De^{-l/4}$, l=1, 2, 3, where D is the normalization factor.

The desired user's multipath attenuations are fixed at $\gamma_1=0.73$, $\gamma_2=0.67$, $\gamma_3=0.35$. The interfering users have transmitted signals similar to that in (1), except that their time origins are randomly selected from 0 to $T_f$ to reflect the asynchronous operation. Each interfering user has the same transmitted signal power as the desired user. Note that, in the simulation, the values of $T_f$, N, $N_h$, $L_c$ and M are fairly small, as the simulation time becomes intolerable for large values of $T_f$, N, $N_h$, $L_c$ and M, and the purpose here is only to show that the new design leads to a better performance. In practice, the values of $T_f$, N, $N_h$, $L_c$ and M may be much larger. Note also that, in addition to the multiple-access interference (MAI), the simulation carried out here also takes the inter-symbol and the inter-frame interference into account, as $\tau_l > T_f - (N_h-1)T_c - \delta$ for l=1, 2, 3 in this case. Denote $E_b/N_0$ as the signal-to-noise ratio (SNR), where $E_b$ is the transmitted signal energy with $E_b=E_p$. The bias and mite root mean squared error (RMSE) of the estimator are examined as functions of $E_b/N_0$.

Figure 2:
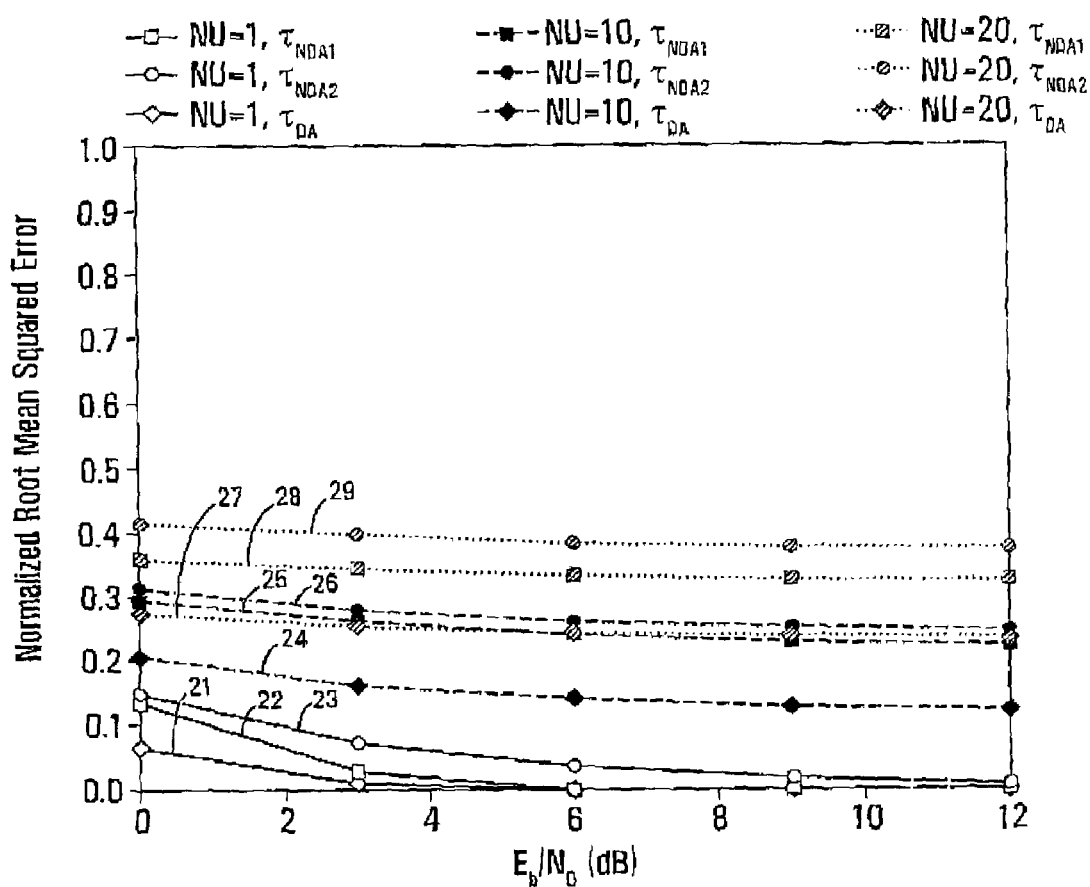
FIG. 2 contains plots of the normalized root mean squared errors of $\tau_{NDA1}$, $\tau_{NDA2}$ and $\tau_{DA}$ for different numbers of users.

FIGS. 1 and 2 show the normalized estimator biases and the normalized RMSEs of $\tau_{NDA1}$, $\tau_{NDA2}$ and $\tau_{DA}$, respectively, where the normalization is with respect to $D_g$, as described in the seventh reference. In FIG. 1, the normalized estimator biases for $\tau_{DA}$, $\tau_{NDA1}$ and $\tau_{NDA2}$ are indicated as: plot lines 11, 12 and 13, respectively, for NU=1; plot lines 14, 15 and 16, respectively, for NU=10; and plot lines 17, 18 and 19, respectively, for NU=20. In FIG. 2, the normalized RMSEs for $\tau_{DA}$, $\tau_{NDA1}$ and $\tau_{NDA2}$ are indicated as: plot lines 21, 22 and 23, respectively, for NU=1; plot lines 24, 25 and 26, respectively, for NU=10; and plot lines 27, 26 and 29, respectively, for NU=20. One sees that the performance of $\tau_{NDA1}$ 12,15,18 improves when the SNR increases and/or the number of users decreases. At large values of SNR, the estimator exhibits a performance floor, caused mainly by the interferences in the system. Comparing $\tau_{NDA1}$ 12,15,18 and 22,25,28 with $\tau_{NDA2}$ 13,16,19 and 23,26,29, one sees that $\tau_{NDA1}$ 12,15,18 and 22,25,28 outperforms $\tau_{NDA2}$ 13,16,19 and 23,26,29 for all the cases considered, as (6) has smaller approximation errors than (5). Also, comparing $\tau_{NDA1}$ 12,15,18 and 22,25,28 with $\tau_{DA}$ 11,14,17, and 21,24,27 one observes that $\tau_{NDA1}$ 12,15,18 and 22,25,28 underperforms $\tau_{DA}$ 11,14,17 and 21,24,27, as expected, as $\tau_{DA}$ 11,14,17 and 21,24,27 uses pilot symbols. However, when NU=1 and the SNR is large, the performance of $\tau_{NDA1}$ 12,15,18 and 22,25,28 approaches that of $\tau_{DA}$ 11,14, 17 and 21,24,27.

Figure 3:
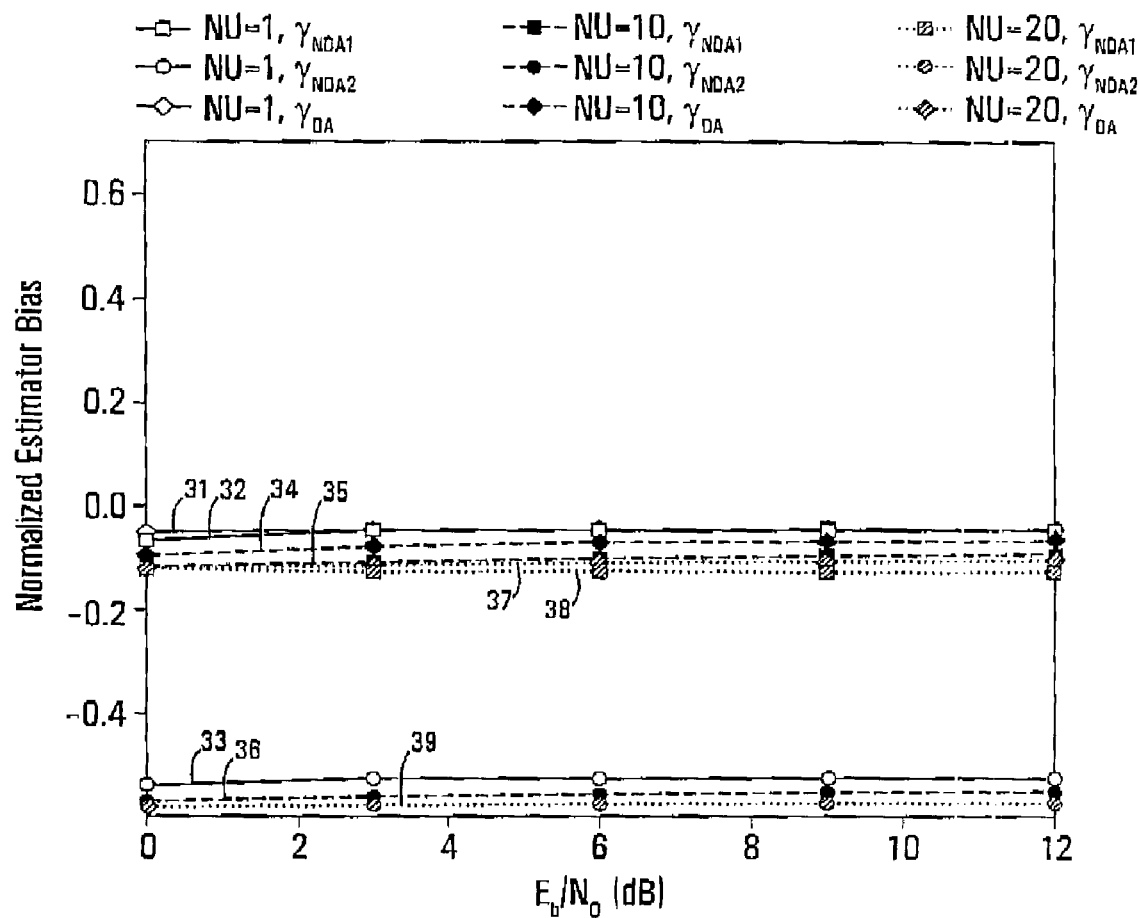
FIG. 3 contains plots of the normalized biases of $\gamma_{NDA1}$, $\gamma_{NDA2}$ and $\gamma_{DA}$ for different numbers of users.
Figure 4:
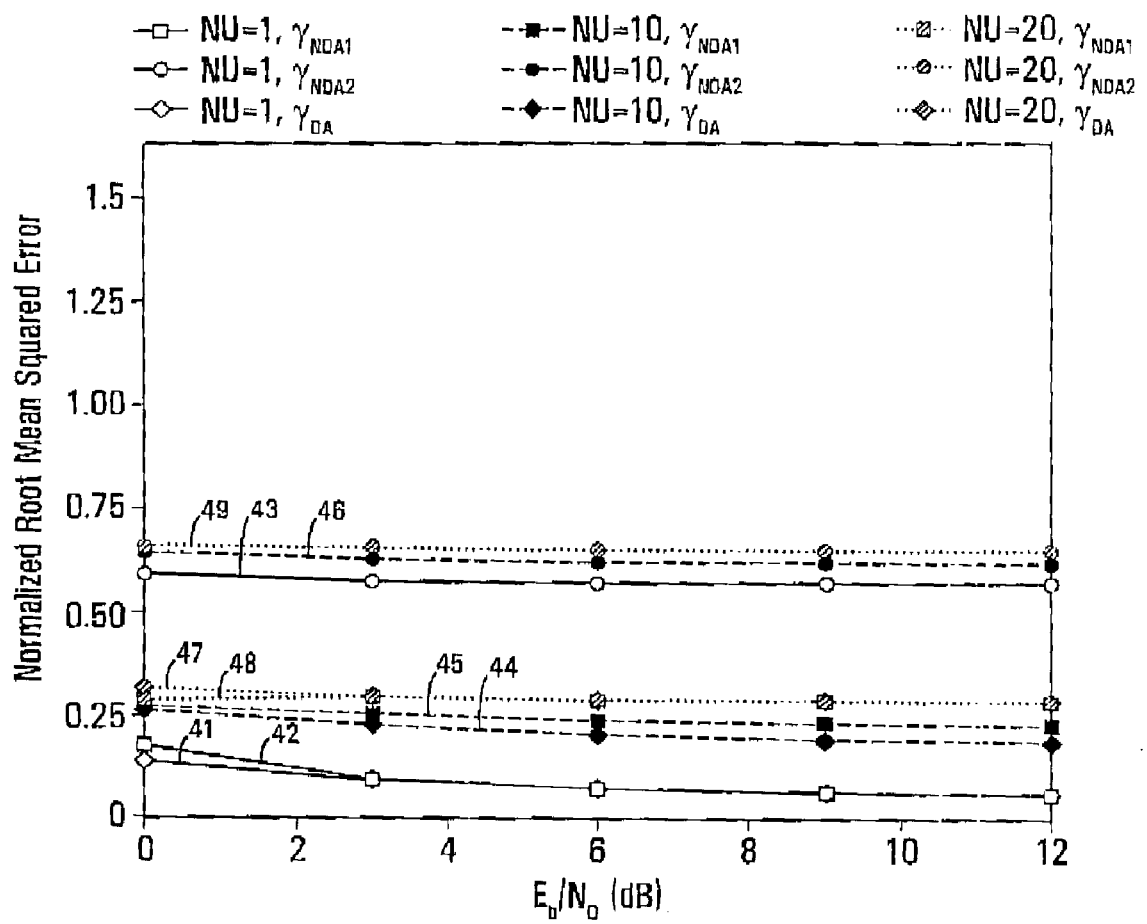
FIG. 4 contains plots of the normalized root mean squared errors of $\gamma_{NDA1}$, $\gamma_{NDA2}$ and $\gamma_{DA}$ for different numbers of users.

FIGS. 3 and 4 show the normalized estimator biases and the normalized RMSEs of $\gamma_{NDA1}$, $\gamma_{NDA2}$ and $\gamma_{DA}$, respectively, where the normalization is with respect to $\gamma_1$, as described in the seventh reference. In FIG. 3, the normalized estimator biases for $\gamma_{DA}$, $\gamma_{NDA1}$ and $\gamma_{NDA2}$ are indicated as: plot lines 31, 32 and 33, respectively, for NU=1; plot lines 34, 35 and 36, respectively, for NU=10; and plot lines 37, 38 and 39, respectively, for NU=20. In FIG. 3, the normalized RMSEs for $\gamma_{DA}$, $\gamma_{NDA1}$ and $\gamma_{NDA2}$ are indicated as: plot lines 41, 42 and 43, respectively, for NU=1; plot lines 44, 45 and 46, respectively, for NU=10; and plot lines 47, 48 and 49, respectively, for NU=20. Again, the performance of $\gamma_{NDA1}$ 32,35,38 and 42,45, 48 improves as the SNR increases and/or the number of users decreases. Comparing $\gamma_{NDA1}$ 32,35,38 and 42,45,48 with $\gamma_{NDA2}$ 33,36,39 and 43,46,49, one sees that $\gamma_{NDA1}$ 32,35,38 and 42,45,48 performs at least 5 times better than $\gamma_{NDA2}$ 33,36,39 and 43,46,49 for all values of SNR considered. Also, comparing ran 32,35,38 and 42,45,48 with $\gamma_{DA}$ 31,34,37 and 41,44,47, one sees that $\gamma_{NDA}$: 32,35,38 and 42,45,48 underperforms $\gamma_{DA}$ 31,34,37 and 41,44,47 in most cases. However, when NU=20 and the SNR is small, the RMSE of reap $\gamma_{NDA1}$ 48 is slightly smaller than that of $\gamma_{DA}$ 47. This is caused by the additional term $|\alpha_{ml}|$ in $J(\tau_l)$, which makes the bias of $\gamma_{NDA1}$ shift from a negative value to a positive value as the SNR decreases. Simulation results in Y. Chen, "Wireless channel state and model parameter estimation," Ph.D. Thesis, University of Alberta, January 2006, which is hereby incorporated by reference in its entirety, indicate that the absolute value of the bias, and therefore, the RMSE of $\gamma_{NDA1}$ are again larger than those of $\gamma_{DA}$ when the SNR decreases further.

Figure 5:
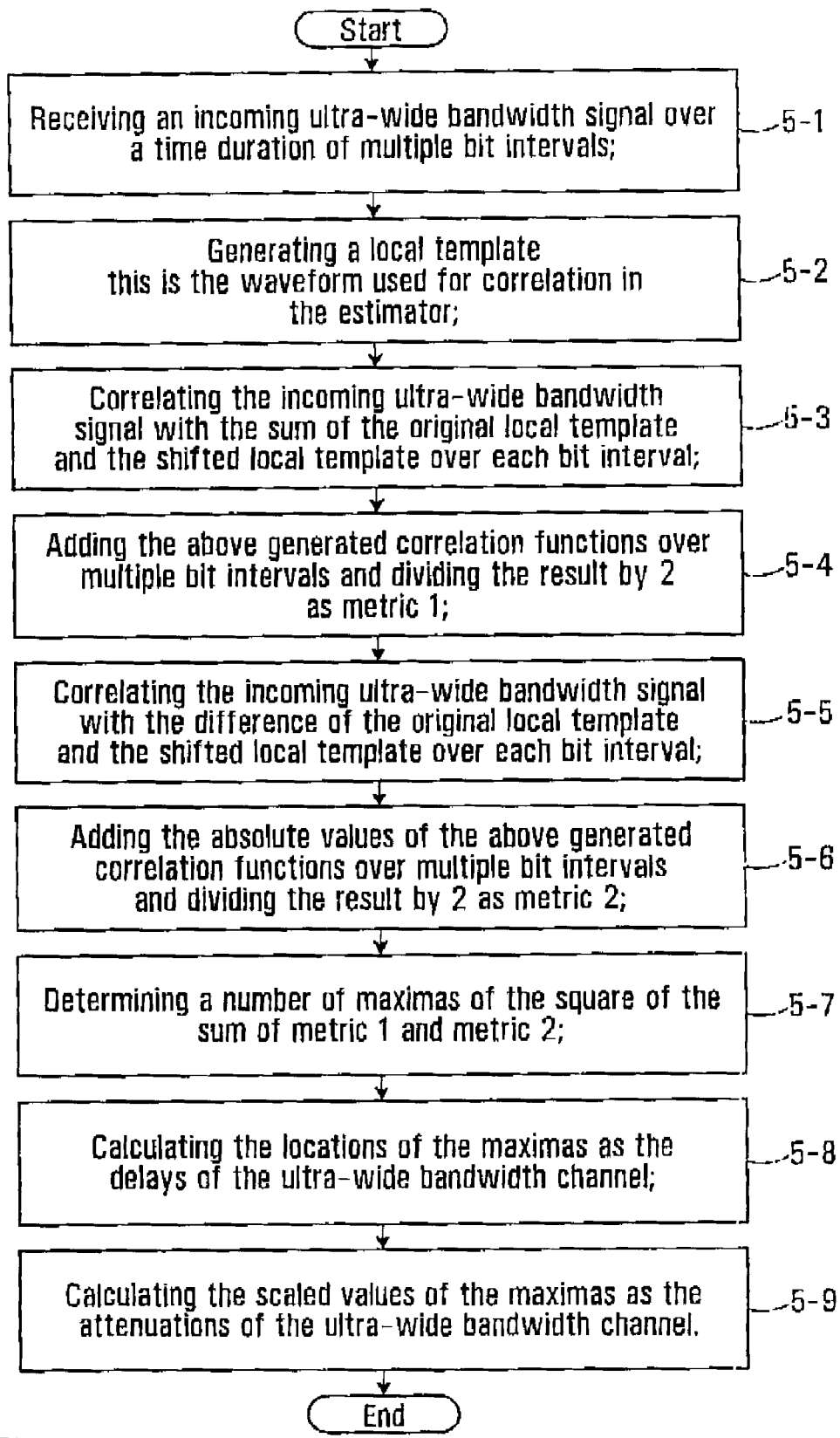
FIG. 5 is a flowchart of a method of estimating the delays and the attenuations of a multipath channel provided by an embodiment of the invention.

FIG. 5 is a flowchart of a method of estimating the delays and the attenuations of an ultra-wide bandwidth channel provided by an embodiment of the invention for the case where the incoming ultra-wide bandwidth signal is pulse position modulated.

Step 5-1: Receiving an incoming ultra-wide bandwidth signal over a time duration of multiple bit. intervals;

Step 5-2: Generating a local template—this is the waveform used for correlation in the estimator;

Step 5-3: Correlating the incoming ultra-wide bandwidth signal with the sum of the original local template and the shifted local template over each bit interval;

Step 5-4: Adding the above generated correlation functions over multiple bit intervals and dividing the result by 2 as metric 1;

Step 5-5: Correlating the incoming ultra-wide bandwidth signal with the difference of the original local template and the shifted local template over each bit interval;

Step 5-6: Adding the absolute values of the above generated correlation functions over multiple bit intervals and dividing the result by 2 as metric 2;

Step 5-7: Determining a number of maximas of the square of the sum of metric 1 and metric 2;

Step 5-8: Calculating the locations of the maximas as the delays of the ultra-wide bandwidth channel;

Step 5-9: Calculating the scaled values of the maximas as the attenuations of the ultra-wide bandwidth channel.

In some embodiments, one or more of the steps shown in the flowchart of FIG. 5 may be removed, replaced, or re-arranged, and one or more additional steps may be added.

The local template can, for example, be generated by changing the positions of the ultra-wide bandwidth pulses according to the user's time-hopping code in a time-hopping ultra-wide bandwidth system or by spreading the ultra-wide bandwidth pulses according to the user's spreading code in a direct-sequence ultra-wide bandwidth system over each bit interval.

The shifted local template can, for example, be generated by shifting the original local template with a time equal to the time shift in pulse position modulation over each bit interval.

In some embodiments, a discrete (sampled signal) correlator is used to calculate a correlation value of the sampled incoming ultra-wide bandwidth signal and the sampled local templates.

The steps of correlating the incoming ultra wide bandwidth signal with the sum and the difference of the original local template and the shifted local template over each bit interval can, for example, be implemented by:

a) shifting the sum and the difference of the original local template and the shifted local template over each bit interval with multiples of an ultra-wide bandwidth monocycle pulse duration;

b) sampling the incoming ultra-wide bandwidth signal and the shifted sum and difference of the local templates over each bit interval; and c) calculating a correlation value of the sampled incoming ultra-wide bandwidth signal and the sampled shifted sum and difference of the local templates over each bit interval.

The step of determining a number of maximas of the square of the sum of metric 1 and metric 2 can for example be implemented by:

a) comparing all the correlation values calculated; and b) selecting $L_c$ largest values with $L_c$ equal to the number of multi-path components of an ultra-wide bandwidth channel.

In some embodiments, the scaled values of the maxima are obtained by dividing the values of the maxima with the signal-to-noise-ratio and the number of bits used in the estimation.

The embodiments described above have assumed pulse position modulation. However UWB systems employing other modulation types car also benefit from the improved estimators with appropriate modifications made to the mathematics, For example, BPSK (binary phase shift keying) could be employed instead of PPM by making the following two changes:

A) set $\beta_{ml}=0$.

B) set $$\alpha_{ml} = \frac{2}{N_0} \int_{t_m}^{t_m+NT_f} r(t)p(t-t_m-\tau_l)\,dt.$$

This can be achieved by replacing the shifted local template $p(t-t_m-\tau_l-\delta)$ in $\alpha_{ml}$ and $\beta_{ml}$ in the above example with another template $-p(t-t-\tau_l)$. All the other calculations and approximations are the same as for the PPM implementation.

Other modulations formats, for example, on-off keying, are also possible by choice of appropriate template and appropriate integration interval.

Figure 7:
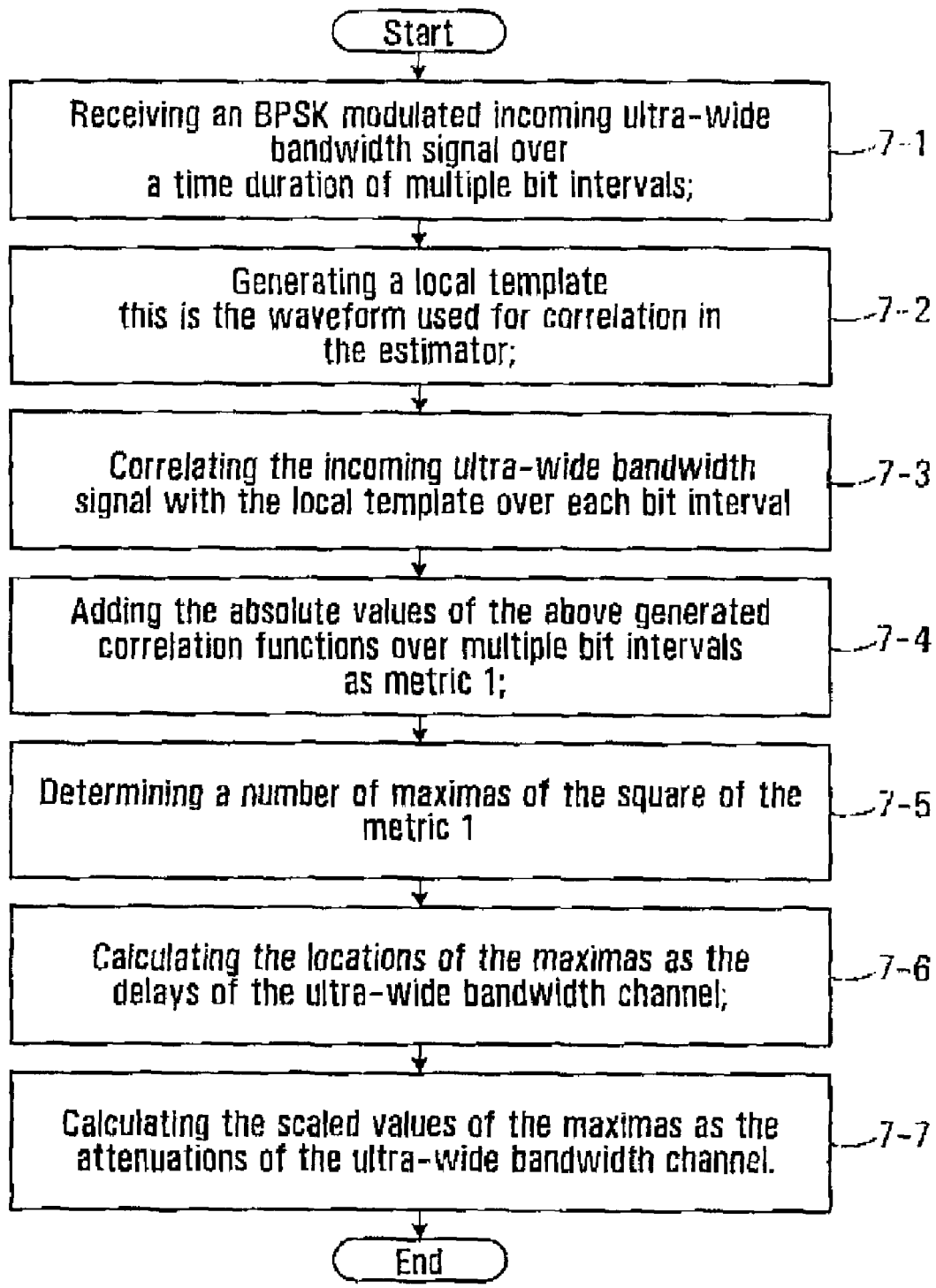
FIG. 7 is a flowchart of a method of estimating the delays and attenuations of a multipath channel provided by an embodiment of the invention.

FIG. 7 is a flowchart of a method of estimating delays and attenuations of an ultra-wide bandwidth channel provided by an embodiment of the invention for the case where the incoming ultra-wide: bandwidth signal is BPSK modulated.

Step 7-1: Receiving an incoming ultra-wide bandwidth signal over a time duration of multiple bit intervals;

Step 7-2: Generating a local template—this is the waveform used for correlation in the estimator;

Step 7-3: Correlating the incoming ultra-wide bandwidth signal with the local template over each bit interval;

Step 7-4: Adding the absolute values of the above generated correlation functions over multiple bit intervals as metric 1;

Step 7-5: Determining a number of maximas of the square of metric 1;

Step 7-5: Calculating the locations of the maximas as the delays of the ultra-wide bandwidth channel;

Step 7-7: Calculating the scaled values or the maximas as the attenuations of the ultra-wide bandwidth channel.

Figure 6:
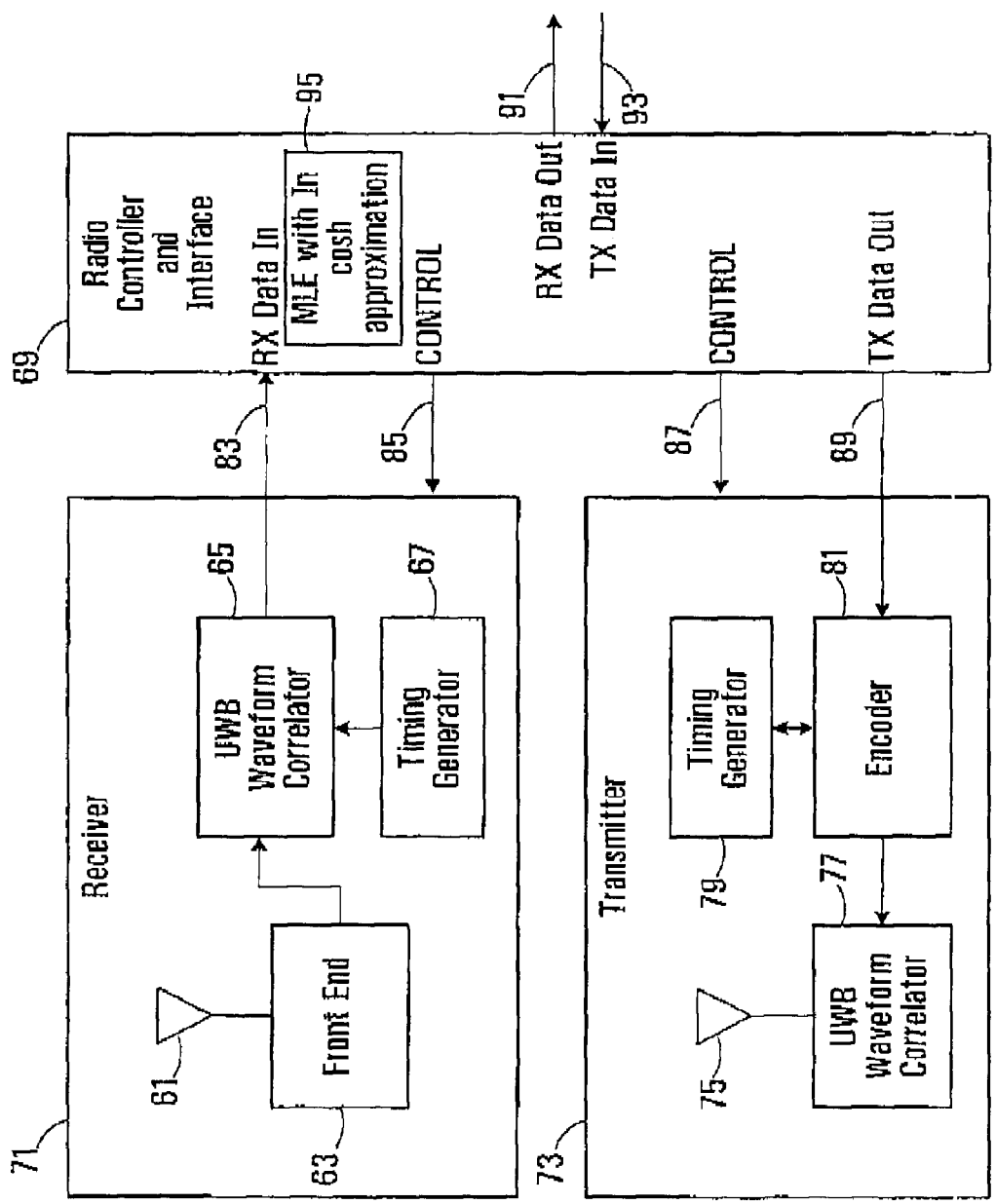
FIG. 6 is a block diagram of a UWB system.

FIG. 6 is a block diagram of an ultra-wide band (UWB) transceiver. In FIG. 6, the transceiver includes three major components, namely, receiver 71, radio controller and interface 69, and transmitter 73. Alternatively, the system may be implemented as a separate receiver 71 and radio controller and interface 69, and a separate transmitter 73 and radio controller and interface 69.

The receiver 71 includes an antenna 61, a receiver front end 63, a UWB waveform correlator 65 and a timing generator 67. The antenna 61 is functionally connected to the receiver front end 63. The receiver front end 63 is functionally connected to the UWB waveform correlator 65, which is functionally connected to a RX (receive) Data input 83 of radio controller and interface 69, and to the timing generator 67. The receiver 71 is also functionally connected to a control output 85 of radio controller and interface 69.

The transmitter 73 includes an antenna 75, a UWB waveform correlator 77, a timing generator 79 and an encoder 81. The antenna 75 is functionally connected to the UWB waveform correlator 77. The UWB waveform correlator 77 is functionally connected to the encoder 81, which is also functionally connected to the timing generator 79 and a TX Data output 89 of the radio controller and interface 69. The transmitter 73 is also functionally connected to a control output 87 of the radio controller and interface 69.

The radio controller and interface 69 includes a MLE (Maximum Likelihood Estimator) with modified ln cosh approximation 95, and also has an RX data output 91 and a TX data input 93.

The radio controller and interface 69 serves as a medium access control (MAC) interface between the UWB wireless communication functions implemented by the receiver 71 and transmitter 73 and applications that use the UWB communications channel for exchanging data with remote devices. FIG. 6 is a specific design and it is to be understood the functional elements can be implemented differently with combining or further separation of the functional blocks.

The methods described can be implemented using the transceiver of FIG. 6. For example, step 5-1 night be implemented in antenna 61 and front end 63; step 5-2 might be implemented in timing generator 67, steps 5-3 and 5-5 might be implemented in waveform correlator 65, with the remaining steps implemented in the MLE with modified ln cosh approximation 95 in radio controller and interface 69. The method shown in FIG. 7, might also be implemented in the transceiver of FIG. 6. For example, step 7-1 might be implemented in antenna 61 and front end 63; step 7-2 might be implemented in timing generator 67, step 7-3 might be implemented in waveform correlator 65, with steps 7-4 to 7-7 implemented in the MLE with modified ln cosh approximation 95.

In some embodiments, the MLE with modified ln cosh approximation 95 approximates $$\ln\cosh\left(\sum_{i=1}^{N} a_i b_i\right) = \sum_{i=1}^{N} a_i |b_i|$$

where $a_i, b_i$ are variables used in the MLE with modified ln cosh approximation 95.

In some embodiments, pulse position modulated signalling is used, in these embodiments, the MLE with modified ln cosh approximation 95 maximizes an approximation of $$\ln \Lambda(\theta) = C - \frac{ME_p}{N_0}\sum_{l=1}^{L_c} \gamma_l^2 + \sum_{m=0}^{M-1} [\ln\cosh(\alpha_m) + \beta_m]$$

where $\theta=[\gamma_1,\ldots,\gamma_{L_c},\tau_1,\ldots,\tau_{L_c}]$ is a parameter vector, C is a constant independent of $\theta$, $$E_p = \int_0^{NT_f} p^2(t)\,dt$$

is the signal energy, cosh(•) is the hyperbolic cosine function, $$\alpha_m = \sum_{l=1}^{L_c} \gamma_l \alpha_{ml},$$

$$\alpha_{ml} = \frac{1}{N_0} \int_{t_m}^{t_m+NT_f} r(t)[p(t-t_m-\tau_l) - p(t-t_m-\tau_l-\delta)] dt,$$

$$\beta_m = \sum_{l=1}^{L_c} \gamma_l \beta_{ml},$$

$$\beta_{ml} = \frac{1}{N} \int_{t_m}^{t_m+NT_f} r(t)[p(t-t_m-\tau_l) + p(t-t_m-\tau_l-\delta)] dt,$$

and $t_m = mNT_f$, and where $$\ln\cosh\left(\sum_{i=1}^{N} a_i b_i\right) = \sum_{i=1}^{N} a_i |b_i|$$

is used to approximate $$\ln\cosh(\alpha_m) \approx \sum_{l=1}^{L_c} \gamma_l |\alpha_{ml}|,$$

with $a_i = \gamma_l$, and $b_i = \alpha_{ml}$.

In some embodiments, involving PPM signalling, the MLE with modified ln cosh approximation calculates the following using sample version of r(t) and p(t):

$$\alpha_{ml} = \frac{1}{N_0} \int_{t_m}^{t_m+NT_f} r(t)[p(t-t_m-\tau_l) - p(t-t_m-\tau_l-\delta)] dt,$$

$$\beta_{ml} = \frac{1}{N_0} \int_{t_m}^{t_m+NT_f} r(t)[p(t-t_m-\tau_l) + p(t-t_m-\tau_l-\delta)] dt.$$

In some embodiments involving PPM signalling, the MLE with modified ln cosh approximation 95 uses the approximation for ln cosh to obtain an expression for $$J^2(\tau) = \left(\sum_{m=0}^{M-1} \frac{|\alpha_{m\tau}| + \beta_{m\tau}}{2}\right)^2$$

wherein the NDA ML estimates of $\tau_l$, $l=1, 2, \ldots, L_c$, are obtained by locating $L_c$ maximas of $J^2(\tau)$, and denoting $\hat{\tau}_l$ as the estimate of $\tau_l$, obtaining the NDA ML estimate of $\gamma_l$, $\hat{\gamma}_l$, using $$\hat{\gamma}_l = \frac{N_0}{ME_p} |J(\hat{\tau}_l)|.$$

In some embodiments, BPSK (binary phase shift keying) modulated signalling is used, in some of theses, embodiments, the MLE with modified ln cosh approximation 95 maximizes an approximation of $$\ln\Lambda(\theta) = C - \frac{ME_p}{N_0}\sum_{l=1}^{L_c} \gamma_l^2 + \sum_{m=0}^{M-1} [\ln\cosh(\alpha_m) + \beta_m]$$

where $\theta = [\gamma_1, \ldots, \gamma_{L_c}, \tau_1, \ldots, \tau_{L_c}]$ is a parameter vector, C is a constant independent of $\theta$, $$E_p = \int_0^{NT_f} p^2(t) dt$$

is the signal energy, $\cosh(\cdot)$ is the hyperbolic cosine function, $$\alpha_m = \sum_{l=1}^{L_c} \gamma_l \alpha_{ml}, \quad \alpha_{ml} = \frac{2}{N_0} \int_{t_m}^{t_m+NT_f} r(t) p(t-t_m-\tau_l) dt,$$

$$\beta_m = \sum_{l=1}^{L_c} \gamma_l \beta_{ml}, \quad \beta_{ml} = 0,$$

and $t_m = mNT_f$, and where $$\ln\cosh\left(\sum_{i=1}^{N} a_i b_i\right) = \sum_{i=1}^{N} a_i |b_i|$$

is used to approximate $$\ln\cosh(\alpha_m) \approx \sum_{l=1}^{L_c} \gamma_l |\alpha_{ml}|,$$

with $a_i = \gamma_l$, and $b_i = \alpha_{ml}$.

The MLE with modified ln cosh approximation 95 might be implemented as hardware, software, firmware or combinations thereof.

The detailed examples above assume that the maximum likelihood estimation with a modified ln cosh approximation approach is applied to the reception of a UWB signal. In some embodiments, the UWB signals are as defined in the literature to be any signal having a signal bandwidth that is greater than 20% of the carrier or center frequency, or a signal having a signal bandwidth of at least 500 MHz. In some embodiments, the maximum likelihood estimation with a modified ln cosh approximation approach is applied to signals having a signal bandwidth greater than 15% of the carrier frequency. In some embodiments, the zonal receiver approach is applied to signals having pulses that are 1 ns in duration or shorter. These applications are not exhaustive nor are they mutually exclusive. For example, most UWB signals satisfying the literature definition will also feature pulses that are 1 ns in duration or shorter.

While many UWB systems are pulse-based, i.e. systems which transmit ultra-wide bandwidth pulses, other UWB systems employ a multi-band approach, in which an ultra-wide bandwidth is divided into multiple sub-bands and signals are sequentially transmitted over the multiple sub-bands, so that cumulatively the multiple sub-band signals occupy the ultra-wide bandwidth. In these multi-band UWB systems, the instantaneous transmitted signal may not occupy a substantial percentage of the center frequency of the signal.

While the detailed examples described above are related to UWB systems, the estimations of delay and attenuation using a modified ln cosh approximation are more generally applicable to any multipath system or multi-antenna system, such as a rake receiver or a multiple receiver antenna diversity system.

CDMA and UWB are examples of broadband systems, wherein a broadband system is defined as any system in which the transmitted signal bandwidth is larger than the bandwidth of the data.

In some embodiments, the maximum likelihood estimation with modified ln cosh approximation approach applied to broadband systems and signals.

In general, as the bandwidth of a broadband system increases, i.e. the broader a broadband system becomes, the number of multipath components received by a receiver increases. Because of the large bandwidth of UWB systems, UWB systems are commonly referred to as rich multipath systems.

While CDMA systems have a narrower bandwidth than UWB systems, they are still susceptible to multipath, and are thus considered multipath systems. A rake receiver for a CDMA system is an example of another system that can benefit from embodiments of the present invention.

Embodiments of the present invention are not limited to rake-based receivers, as embodiments of the present invention are also applicable to conventional multiple receiver antenna diversity systems using, for example maximal ratio combining or equal gain combining. Embodiments of the present invention are also applicable to systems that include selection diversity and switched diversity.

In some embodiments, both the estimate of the channel attenuations and the estimate of the channel delays determined using the maximum likelihood estimation with modified ln cosh approximation approach are used. For example, in some maximal ratio combining applications, both the estimated channel attenuations and the estimated channel delays are used.

In some embodiments, only the estimates of the channel delay are used. For example, in some equal gain combining applications, only estimates of the delays are used. In this case, the attenuations would not necessarily need to be calculated.

For the purposes of this application, it is assumed that multipath may include branch signals from multiple receiver antennas in a multiple receiver antenna system, and/or may include multiple delayed and attenuated copies of a signal received on a single antenna, this being the more conventional definition of multipath.

Numerous modifications and variations of the present invention are possible in light of the above teachings. It is therefore to be understood that within the scope of the appended claims, the invention may be practiced otherwise than as specifically described herein.

we claim:

1. A method comprising:
estimating delays using a non-known data-aided maximum likelihood estimator with modified ln cosh approximation;
as part of the maximum likelihood estimator with modified ln cosh approximation, approximating $$\ln \cosh\left(\sum_{i=1}^{N} a_i b_i\right) = \sum_{i=1}^{N} a_i |b_i|$$

where $a_i$, $b_i$ are variables used in the maximum likelihood estimator with modified ln cosh approximation.

2. The method of claim 1, further comprising estimating attenuations using the maximum likelihood estimator with modified ln cosh approximation.

3. The method of claim 2, further comprising:
receiving a signal over a multipath channel, wherein the delays and attenuations correspond to delays and attenuations of multipath components of the multipath channel respectively.

4. The method of claim 2, further comprising:
receiving a respective signal over each of a plurality of antennas;
wherein the delays and attenuations correspond to delays and attenuations of the signals.

5. The method of claim 3, wherein the signal comprises an ultra-wide bandwidth signal.

6. The method of claim 3, wherein the signal comprises a signal with a signal bandwidth of at least 20% of a center frequency of the signal.

7. The method of claim 3, wherein the signal comprises a signal with a signal bandwidth of at least 15% of a center frequency of the signal.

8. The method of claim 3, wherein the signal comprises a plurality of pulses with a pulse width of less than about 1 ns.

9. The method of claim 3, wherein the signal comprises a broadband signal.

10. The method of claim 3, wherein the signal comprises a CDMA (code division multiple access) signal.

11. The method of claim 2, further comprising:
receiving a respective signal over each of a plurality of antennas in a multiple receiver antenna diversity system;
wherein the delays and attenuations collectively comprise a respective delay and a respective attenuation for each signal.

12. The method of claim 11, further comprising performing maximal ratio combining.

13. The method of claim 1, comprising
estimating the delays; and
performing equal gain combining 14. The method of claim 3, wherein:
using the maximum likelihood estimator with modified ln cosh approximation comprises maximizing an approximation of $$\ln \Lambda(\theta) = C - \frac{ME_P}{N_0} \sum_{l=1}^{L_c} \gamma_l^2 + \sum_{m=0}^{M-1} [\ln \cosh(\alpha_m) + \beta_m]$$

where $\theta = [\gamma_1, \ldots, \gamma_{L_c}, \tau_1, \ldots, \tau_{L_c}]$ is a parameter vector, C is a constant independent of $\theta$, $E_P = \int_o^{NT_f} p^2(t)dt$ is the signal energy, cosh (•) is the hyperbolic cosine function, $$\alpha_m = \sum_{l=1}^{L_c} \gamma_l \alpha_{ml},$$

$$\alpha_{ml} = \frac{1}{N_0} \int_{t_m}^{t_m+NT_f} r(t)[p(t-t_m-\tau_l) - p(t-t_m-\tau_l-\delta)]dt,$$

$$\beta_m = \sum_{l=1}^{L_c} \gamma_l \beta_{ml},$$

$$\beta_{ml} = \frac{1}{N_0} \int_{t_m}^{t_m+NT_f} r(t)[p(t-t_m-\tau_l) - p(t-t_m-\tau_l-\delta)]dt, \text{ and}$$

$$t_m = mNT_f,$$

and where $$\ln \cosh\left(\sum_{i=1}^{N} a_i b_i\right) = \sum_{i=1}^{N} a_i |b_i|$$

is used to approximate $$\ln \cosh(\alpha_m) \approx \sum_{l=1}^{L_c} \gamma_l |\alpha_{ml}|,$$

with $a_i = \gamma_l$, and $b_i = \alpha_{ml}$, and where the delays are $\tau_l$, $l=1$ to $L_c$, and the attenuations are $\tau_l$, $l=1$ to $L_c$.

15. The method of claim 14 wherein:

$$\alpha_{ml} = \frac{1}{N_0} \int_{t_m}^{t_m+NT_f} r(t)[p(t-t_m-\tau_l) - p(t-t_m-\tau_l-\delta)]dt,$$

$$\beta_{ml} = \frac{1}{N_0} \int_{t_m}^{t_m+NT_f} r(t)[p(t-t_m-\tau_l) + p(t-t_m-\tau_l-\delta)]dt$$

are calculated using sampled versions of r(t) and p(t).

16. The method of claim 15 comprising using the approximation for ln cosh to obtain an expression for $$J^2(\tau) = \left(\sum_{m=0}^{M-1} \frac{|\alpha_{m\tau}| + \beta_{m\tau}}{2}\right)^2$$

wherein the NDA ML estimates with modified ln cosh approximation of $\tau_l$, $l=1, 2, \ldots, L_c$, are obtained by locating $L_c$ maximas of $J^2(\tau)$, and denoting $\hat{\tau}_l$ as the estimate of $\tau_l$, obtaining the NDA ML estimates with modified ln cosh approximation of $\gamma_l$, $\hat{\gamma}_l$, using $$\hat{\gamma}_l = \frac{N_0}{ME_p} |J(\hat{\tau}_l)|.$$

17. The method of claim 14 wherein the signal comprises a pulse position modulated signal.

18. The method of claim 3 wherein:
using the maximum likelihood estimator with modified ln cosh approximation comprises maximizing an approximation of $$\ln \Lambda(\theta) = C - \frac{ME_p}{N_0} \sum_{l=1}^{L_c} \gamma_l^2 + \sum_{m=0}^{M-1} [\ln \cosh(\alpha_m) + \beta_m]$$

where $\theta = [\gamma_1, \ldots, \gamma_{L_c}, \tau_1, \ldots, \tau_{L_c}]$ is a parameter vector, C is a constant independent of $\theta$, $E_F = \int_o^{NT_f} p^2(t)dt$ is the signal energy, cosh (•) is the hyperbolic cosine function, $$\alpha_m = \sum_{l=1}^{L_c} \gamma_l \alpha_{ml}, \alpha_{ml} = \frac{2}{N_0} \int_{t_m}^{t_m+NT_f} r(t)p(t-t_m-\tau_l)dt,$$

$$\beta_m = \sum_{l=1}^{L_c} \gamma_l \beta_{ml}, \beta_{ml} = 0,$$

and $t_m = mNT_f$, and where $$\ln \cosh\left(\sum_{i=1}^{N} a_i b_i\right) = \sum_{i=1}^{N} a_i |b_i|$$

is used to approximate $$\ln \cosh(\alpha_m) \approx \sum_{l=1}^{L_c} \gamma_l |\alpha_{ml}|,$$

with $a_1 = \gamma_l$, and $b_i = \alpha_{ml}$, and where the delays are $\tau_l$, $l=1$ to $L_c$, and the attenuations are $\gamma_l$, $l=1$ to $L_c$.

19. The method of claim 18 wherein the signal comprises a BPSK (Binary Phase Shift Keying) modulated signal.

20. A method in a receiver of estimating delays and attenuations comprising:
receiving an incoming signal over a time duration of multiple bit intervals;
generating a local template;
correlating the incoming signal with the sum of the original local template and a shifted local template over each bit interval to generate a first correlation function over each bit interval;
adding the above generated first correlation functions over multiple bit intervals and dividing the result by 2 as metric 1;
correlating the incoming signal with the difference of the original local template and the shifted local template over each bit interval to generate a second correlation function over each bit interval;
adding the absolute values of the above generated second correlation functions over multiple bit intervals and dividing the result by 2 as metric 2;
determining a number of maximas of the square of the sum of metric 1 and metric 2;
calculating locations of the maximas as the delays;

calculating scaled values of the maximas as the attenuations.

21. The method of claim 20 wherein receiving an incoming signal comprises receiving a pulse position modulated ultra-wide bandwidth signal over a multipath channel and the delays and the attenuations correspond to delays and attenuations of multipath components.

22. The method of claim 21 wherein the local template is generated by any one of the following:
changing positions of ultra-wide bandwidth pulses according to a user's time-hopping code in a time-hopping ultra-wide bandwidth system; and
spreading ultra-wide bandwidth pulses according to a user's spreading code in a direct-sequence ultra-wide bandwidth system over each bit interval.

23. The method of claim 21 wherein the shifted local template is generated by shifting the original local template with a time equal to the time shift in pulse position modulation over each bit interval.

24. The method of claim 21 wherein a discrete (sampled signal) correlator is used to calculate a correlation value of the sampled incoming ultra-wide bandwidth signal and the sampled local templates.

25. The method of claim 24 wherein the steps of correlating the incoming ultra wide bandwidth signal with the sum and the difference of the original local template and the shifted local template over each bit interval comprise:
a) shifting the sum and the difference of the original local template and the shifted local template over each bit interval with multiples of the ultra-wide bandwidth pulse duration;
b) sampling the incoming ultra-wide bandwidth signal and the shifted sum and difference of the local templates over each bit interval; and
c) calculating a correlation value of the sampled incoming ultra-wide bandwidth signal and the sampled shifted sum and difference of the local templates over each bit interval.

26. The method of claim 21 wherein the step of determining a number of maximas of the square of the sum of metric 1 and metric 2 comprises:
a) comparing all the correlation values calculated; and
b) selecting $L_c$ largest values with $L_c$ at most equal to the number of multi-path components of the multipath channel.

27. A method in a receiver of performing non-known data-aided estimation of delays and attenuations of an ultra-wide bandwidth channel comprising:
receiving an incoming signal over a time duration of multiple bit intervals;
generating a local template;
correlating the incoming signal with the local template over each bit interval to generate a correlation function over each bit interval;
adding the absolute values of the above generated correlation functions over multiple bit intervals as metric 1;
determining a number of maximas of the square of metric 1;
calculating the locations of the maximas as the delays;
calculating scaled values of the maximas as the attenuations.

28. The method of claim 27 wherein the signal comprises a BPSK (binary phase shift keying) modulated ultra-wide bandwidth signal received over a multipath channel and the delays and the attenuations correspond to delays and attenuations of multipath components of the multipath channel.

29. The method of claim 28 wherein the local template is generated by any one of the following:
changing positions of ultra-wide bandwidth pulses according to a user's time-hopping code in a time-hopping ultra-wide bandwidth system; and
spreading ultra-wide bandwidth pulses according to a user's spreading code in a direct-sequence ultra-wide bandwidth system over each bit interval.

30. The method of claim 28 wherein a discrete (sampled signal) correlator is used to calculate a correlation value of the sampled incoming ultra-wide bandwidth signal and the sampled local templates.

31. The method of claim 30 wherein the steps of correlating the incoming ultra-wide bandwidth signal with the original local template over each bit interval comprise:
a) sampling the incoming ultra-wide bandwidth signal and the original local template over each bit interval; and
b) calculating a correlation value of the sampled incoming ultra-wide bandwidth signal and the sampled original local template over each bit interval.

32. The method of claim 28 wherein the step of determining a number of maximas of the square of metric 1 comprises:
a) comparing all the correlation values calculated; and
b) selecting $L_c$ largest values with $L_c$ at most equal to the number of multi-path components of the multipath channel.

33. The method of claim 20 wherein the scaled values of the maxima are obtained by dividing the values of the maxima with the signal-to-noise-ratio and the number of bits used in the estimation.

34. An apparatus operable to estimate delays, comprising:
a non-known data-aided MLE (Maximum Likelihood Estimator) with modified ln cosh approximation according to $$\ln\cosh\left(\sum_{i=1}^{N} a_i b_i\right) = \sum_{i=1}^{N} a_i |b_i|$$

where $a_i$, $b_i$ are variables used in the MLE with modified ln cosh approximation.

35. The apparatus of claim 34, wherein the apparatus is operable to estimate attenuations.

36. The apparatus of claim 35, further comprising:
at least one antenna operable to receive a signal over a multipath channel, wherein the delays and attenuations correspond to delays and attenuations of multipath components of the multipath channel respectively.

37. The apparatus of claim 35, further comprising:
a plurality of antennas respectively operable to receive a respective signal, wherein the delays and attenuations correspond to delays and attenuations of the signals.

38. The apparatus of claim 36, wherein the signal comprises an ultra-wide bandwidth signal.

39. The apparatus of claim 36, wherein the signal comprises a signal with a signal bandwidth of at least 20% of a center frequency of the signal.

40. The apparatus of claim 36, wherein the signal comprises a signal with a signal bandwidth of at least 15% of a center frequency of the signal.

41. The apparatus of claim 36, wherein the signal comprises a plurality of pulses with a pulse width of less than about 1 ns.

42. The apparatus of claim 36, wherein the signal comprises a broadband signal.

43. The apparatus of claim 36, wherein the signal comprises a CDMA (code division multiple access) signal.

44. The apparatus of claim 35, further comprising:
a plurality of antennas in a multiple receiver antenna diversity system respectively operable to receive a respective signal, wherein
the delays and attenuations collectively comprise a respective delay and a respective attenuation for each signal.

45. The apparatus of claim 43, wherein the apparatus is operable to perform maximal ratio combining.

46. The apparatus of claim 34, wherein the apparatus is operable to perform equal gain combining.

47. The apparatus of claim 36, operable to receive pulse position modulated signals, wherein the MLE with modified ln cosh approximation maximizes an approximation of $$\ln \Lambda(\theta) = C - \frac{ME_p}{N_0} \sum_{l=1}^{L_c} \gamma_l^2 + \sum_{m=0}^{M-1} [\ln \cosh(\alpha_m) + \beta_m]$$

where $\theta = [\gamma_1, \ldots, \gamma_{L_c}, \tau_1, \ldots, \tau_{L_c}]$ is a parameter vector, C is a constant independent of $\theta$, $E_P = \int_o^{NT_f} p^2(t)dt$ is the signal energy, cosh (•) is the hyperbolic cosine function, $$\alpha_m = \sum_{l=1}^{L_c} \gamma_l \alpha_{ml},$$

$$\alpha_{ml} = \frac{1}{N_0} \int_{t_m}^{t_m + NT_f} r(t)[p(t - t_m - \tau_l) - p(t - t_m - \tau_l - \delta)] dt,$$

$$\beta_m = \sum_{l=1}^{L_c} \gamma_l \beta_{ml},$$

$$\beta_{ml} = \frac{1}{N_0} \int_{t_m}^{t_m + NT_f} r(t)[p(t - t_m - \tau_l) - p(t - t_m - \tau_l - \delta)] dt, \text{ and}$$

$$t_m = mNT_f,$$

and where $$\ln \cosh\left(\sum_{i=1}^{N} a_i b_i\right) = \sum_{i=1}^{N} a_i |b_i|$$

is used to approximate $$\ln \cosh(\alpha_m) \approx \sum_{l=1}^{L_c} \gamma_l |\alpha_{ml}|,$$

with $a_i = \gamma_l$, and $b_i = \alpha_{ml}$, and where the delays are $\tau_l$, l=1 to $L_c$, and the attenuations are $\gamma_l$, l=1 to $L_c$.

48. The apparatus of claim 47, wherein:

$$\alpha_{ml} = \frac{1}{N_0} \int_{t_m}^{t_m + NT_f} r(t)[p(t - t_m - \tau_l) - p(t - t_m - \tau_l - \delta)] dt,$$

$$\beta_{ml} = \frac{1}{N_0} \int_{t_m}^{t_m + NT_f} r(t)[p(t - t_m - \tau_l) + p(t - t_m - \tau_l - \delta)] dt$$

are calculated by the MLE with modified ln cosh approximation using sampled versions of r(t) and p(t).

49. The apparatus of claim 48 wherein the MLE with modified ln cosh approximation uses the approximation for ln cosh to obtain an expression for $$J^2(\tau) = \left(\sum_{m=0}^{M-1} \frac{|\alpha_{m\tau}| + \beta_{m\tau}}{2}\right)^2$$

wherein the NDA ML estimates of $\tau_l$, l=1,2, ..., $L_c$, are obtained by locating $L_c$ maximas of $J^2(\tau)$, and denoting $\hat{\tau}_l$ as the estimate of $\tau_l$, obtaining the NDA ML estimate of $\gamma_l$, $\hat{\gamma}_l$, using $$\hat{\gamma}_l = \frac{N_0}{ME_p} |J(\hat{\tau}_l)|.$$

50. The apparatus of claim 36, operable to receive BPSK (binary phase shift keying) modulated signals, wherein the MLE maximizes an approximation of $$\ln \Lambda(\theta) = C - \frac{ME_p}{N_0} \sum_{l=1}^{L_c} \gamma_l^2 + \sum_{m=0}^{M-1} [\ln \cosh(\alpha_m) + \beta_m]$$

where $\theta=[\gamma_1, \ldots, \gamma_{L_c}, \tau_1, \ldots, \tau_{L_c}]$ is a parameter vector, C is a constant independent of $\theta$, $E_P=\int_o^{NT_f} p^2(t)dt$ is the signal energy, cosh (•) is the hyperbolic cosine function, $$\alpha_m = \sum_{l=1}^{L_c} \gamma_l \alpha_{ml}, \quad \alpha_{ml} = \frac{2}{N_0} \int_{t_m}^{t_m+NT_f} r(t)p(t-t_m-\tau_l)\,dt,$$

$$\beta_m = \sum_{l=1}^{L_c} \gamma_l \beta_{ml}, \quad \beta_{ml} = 0,$$

and $t_m = mNT_f$, and where $$\ln \cosh\left(\sum_{L=1}^{N} a_i b_i\right) = \sum_{1}^{N} a_i |b_i|$$

is used to approximate $$\ln \cosh(\alpha_m) \approx \sum_{l=1}^{L_c} \gamma_l |\alpha_{ml}|,$$

with $a_i = \gamma_l$, and $b_i = \alpha_{ml}$, and where the delays are $\tau_l$, l=1 to $L_c$, and the attenuations are $\gamma_l$, l=1 to $L_c$.

* * * * *

UNITED STATES PATENT AND TRADEMARK OFFICE
CERTIFICATE OF CORRECTION

| | | |
|---|---|---|
| PATENT NO. | : 8,130,817 B2 | Page 1 of 1 |
| APPLICATION NO. | : 12/282119 | |
| DATED | : March 6, 2012 | |
| INVENTOR(S) | : Norman C. Beaulieu and Yunfei Chen | |

It is certified that error appears in the above-identified patent and that said Letters Patent is hereby corrected as shown below:

At column 7, line 20, delete "$[\tau_1,..., \tau_{Lc})]$" and replace with -- $[\tau_1,..., \tau_{Lc}]$ --.

At column 8, line 3, delete "MLE with modified." and replace with -- MLE with modified --.

At column 11, line 12, delete "Equivalently, ore can" and replace with -- Equivalently, one can --.

At column 15, line 48, delete "7-5" and replace with -- 7-6 --.

At column 15, line 50, delete "values or the" and replace with -- values of the --.

Claim 14, column 21, line 10, delete "$\tau_1) - p(t$" and replace with -- $\tau_1) + p(t$ --.

Claim 15, column 21, line 31, delete "$\tau_1, 1=1$" and replace with -- $\gamma_1, 1=1$ --.

Claim 47, column 25, line 51, delete "$\tau_1) - p(t$" and replace with -- $\tau_1) + p(t$ --.

Claim 48, column 26, line 30, delete "cosh a pproximation" and replace with -- cosh approximation --.

Signed and Sealed this
Nineteenth Day of March, 2013

Teresa Stanek Rea
*Acting Director of the United States Patent and Trademark Office*